United States Patent [19]

Budde

[11] Patent Number: 5,757,586
[45] Date of Patent: May 26, 1998

[54] FLEXURE MOUNTING PLATE WITH DESWAGING TABS

[75] Inventor: Richard August Budde, Plymouth, Minn.

[73] Assignee: Seagate Technology, Inc., Scotts Valley, Calif.

[21] Appl. No.: 842,632

[22] Filed: Apr. 16, 1997

Related U.S. Application Data

[60] Provisional application No. 60/023,226 Aug. 5, 1996.
[51] Int. Cl.⁶ .................................................. G11B 5/48
[52] U.S. Cl. .................................................. 360/104
[58] Field of Search .............................. 360/104, 106; 29/268, 426.5

[56] References Cited

U.S. PATENT DOCUMENTS 5,012,367 4/1991 Toensing ........................ 360/104
5,347,413 9/1994 Hanke ........................... 360/104
5,570,249 10/1996 Aoyagi .......................... 360/104

*Primary Examiner*—A. J. Heinz
*Attorney, Agent, or Firm*—Edward P. Heller, III; Raghunath S. Minisandram

[57] ABSTRACT

A flexure mounting system that facilitates removal of a faulty head/flexure assembly in a disc drive. The flexure mounting system includes an improved mounting plate for head/flexure assemblies in disc drives. The improved mounting plate includes deswaging tabs which extend laterally beyond the width of the actuator head mounting arms to which the mounting plates and attached head/flexure assemblies are mounted. A disassembly tool, configured to operatively engage the deswaging tabs, and a specially featured flex circuit adapted for use with the improved mounting plate are also disclosed.

4 Claims, 9 Drawing Sheets

FLEXURE MOUNTING PLATE WITH DESWAGING TABS

CROSS REFERENCE TO RELATED APPLICATION

This application claims the benefit of U.S. provisional application Ser. No. 60/023,226, filed Aug. 5, 1996 now abandoned.

BACKGROUND OF THE INVENTION

This invention relates generally to the field of rigid disc drives and more particularly, but not by way of limitation, to an improved flexure mounting system that includes features which facilitate the removal of defective head/flexure/mounting plate assemblies for rework purposes.

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

A typical head suspension includes four integrally formed portions: 1) a mounting portion, for attaching the head suspension to the actuator used to move the heads from track to track; 2) a spring portion, to provide a counterbalancing force to balance the hydrodynamic lifting force of the slider and maintain consistent flying height of the head; 3) a rigid beam portion for transferring the counterbalancing force of the spring portion to the head/slider assembly; and 4 ) a gimbal portion, to which the head/slider assembly is attached, which is compliant in the head assembly's roll and pitch axes to allow the slider to follow minor variations in the flatness of the discs, and stiff in the head assembly's yaw and in-plane axes to permit accurate positioning of the head.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

The head suspensions, or flexures, described above have typically been fabricated from full hardened 300 series stainless steel foil, with flexures of the current generation being formed of flat stainless steel stock 0.0025 inches thick. Typical flexures which could be modified to implement the present invention are described in detail in U.S. Pat. Nos. 5,428,490 and 5,331,489, both assigned to the assignee of the present invention and incorporated herein by reference as if included herein in their entireties.

As noted in the previously incorporated references, since the flexures are typically formed of relatively weak material, and, since the attachment of the flexures to the actuator assembly must be very strong and rigid, the flexure assemblies typically include mounting plates, contiguous to the mounting portion of the flexure, to stiffen the mounting portion and allow for strong mechanical connection of the head suspension assembly to the actuator assembly. These mounting plates are commonly formed of stainless steel having a thickness of approximately 0.008 inches.

Several different attachment systems have historically been used to connect flexures with mounting plates to actuator arms, including rivets (U.S. Pat. No. 4,783,710, Salyer, et al.), machine screws, adhesives and swaging (U.S. Pat. No. 5,262,911, Eckerd, et al). The two immediately preceding patents are also assigned to the assignee of the present invention and are also incorporated herein by reference. By far, the most commonly used flexure mounting system in current use is swaging.

Swage mounting systems include base plates with substantially cylindrical swaging bosses. The flexure, or head suspension, is typically laser-welded to the base plate. The attachment of the flexure/mounting plate assembly to the actuator head mounting arm is accomplished by placing the swaging boss of the mounting plate into a cooperatively sized hole near the distal end of the actuator head mounting arm. A swaging tool having an outer diameter slightly larger than the inner diameter of the swaging boss, is then passed through the swaging boss, plastically deforming the swaging boss and expanding it into contact with the inner surface of the hole in the actuator head mounting arm. By closely controlling the dimensions of the swaging boss, the hole in the actuator head mounting arm and the swaging tool, the amount of attachment force can also be controlled in a manner that permits adequate attachment force to satisfy the mechanical shock requirements of the disc drive without producing undue stresses on the materials of the components.

One of the inherent problems with swage mounting of head suspensions is the difficulty of removing the flexure/mounting plate assembly should a component failure necessitate rework and replacement.

Several different types of swage mounting systems are known in the art, with the problems of removal for rework varying accordingly. Many of these reworking difficulties arise because of the common practice of attaching a pair of flexure/mounting plate assemblies to a single actuator head mounting arm which lies between adjacent disc surfaces.

In a first common swage mounting system, referred to as "back-to-back" swaging, a pair of flexure/mounting plate assemblies are positioned on opposite sides of an actuator head mounting arm with the two swaging bosses extending into a single hole in the head mounting arm from opposite directions. When the swaging tool is passed through the swaging bosses, both flexure/mounting plate assemblies are attached simultaneously to the head mounting arm. While this flexure mounting system is efficient in terms of manufacturing, removal of a flexure/mounting plate assembly for rework requires that a knife blade, or similar tool, be inserted between the head mounting arm and the periphery of the mounting plate and that the mounting plate be pried off, resulting in potential damage to the head mounting arm. Since, in disc drives of the present generation, the head mounting arms are integrally formed with the actuator bearing housing, any damage to even one of the head mounting arms would necessitate the scrapping of the relatively expensive actuator bearing housing/head mounting arm assembly. Furthermore, since the head/head suspension assemblies are typically mounted to the actuator head mounting arms after the VCM coil is attached, the cost of scrapping the entire assembly is even greater.

The alternative swage mounting system of previously incorporated U.S. Pat. No. 5,262,911 includes rectangular mounting plates with which the swage bosses for up and down head/flexure assemblies are offset along the length of the actuator head mounting arms. Such a mounting system reduces the necessary thickness of the actuator head mounting arms and thus allows for close disc spacing in the disc drive. Furthermore, since the ends of the swaging bosses are exposed, the individual head/flexure assemblies can be readily removed by exerting pressure on the swaging boss. However, the use of this mounting system requires that swaging be done from both up and down directions during assembly, and the elongated swage mounting plates add undesirable mass to the moving portion of the actuator assembly A second alternative swage mounting system frequently used in the industry is the so-called "Interlok™" system. Interlok™ is a trademark of Hutchinson Technology incorporated and this technology is described in U.S. Pat. No. 5,172,286, issued Dec.15, 1992, assigned to Hutchinson Technology Incorporated, of Hutchinson, MN. With this design, the up facing and down facing head/flexure assemblies have swage bosses with different diameters, such that the swage boss of one head/flexure assembly will nest within the swage boss of the opposing head/flexure assembly mounted on the same actuator head mounting arm. One disadvantage of this system is that two different mounting plates are used for up and down head/flexure assemblies, with attendant additional inventory and parts costs. Furthermore, in certain cases, the failure of one of the head/flexure assemblies mounted to one actuator head mounting arm necessitates the scrapping of both head/ flexure assemblies, as will be explained below.

A need clearly exists, therefore, for an improved head/ flexure assembly mounting system which facilitates removal of defective head/flexure assemblies, while eliminating the need for unique mounting plate configurations for up and down head/flexure assemblies.

BRIEF SUMMARY OF THE INVENTION

The present invention includes an improved mounting plate for head/flexure assemblies in disc drives. The improved mounting plate includes deswaging tabs which extend laterally beyond the width of the actuator head mounting arms to which the mounting plates and attached head/flexure assemblies are mounted. A disassembly tool configured to operatively engage the deswaging tabs and a specially featured flex circuit adapted for use with the improved mounting plate are also disclosed.

It is an object of the invention to provide an improved swage mounting plate for head/flexure assemblies in disc drives which facilitates removal of defective head/flexure assemblies.

It is another object of the invention to provide a disassembly tool for disassembling head/flexure assemblies fabricated with the improved swage mounting plate from actuator head mounting arms in disc drives.

It is another object of the invention to provide a swage mounting system for head/flexure assemblies in disc drives which does not require unique components for up and down head/flexure assemblies.

It is another object of the invention to provide a swage mounting system for head/flexure assemblies in disc drives which contributes to minimization of component scrap costs.

These and other objects, features and benefits of the invention can best be understood by an examination of the following Detailed Description of the Invention, when read in conjunction with a review of the accompanying drawings.

DETAILED DESCRIPTION OF THE INVENTION

Figure 1:
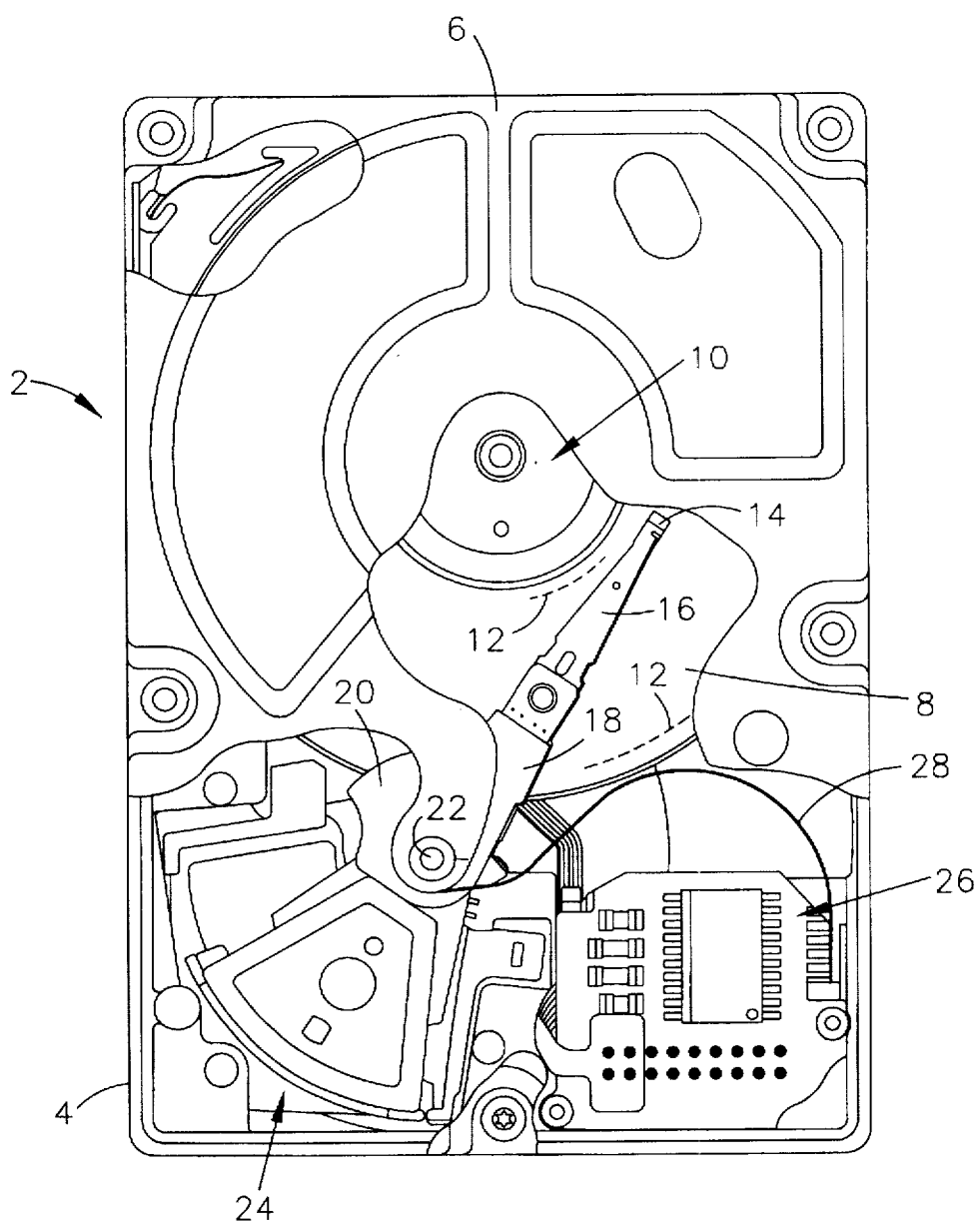
FIG. 1 is a plan view of a disc drive in which the present invention is particularly useful.

Turning now to the drawings and specifically to FIG. 1, shown is a plan view of a disc drive 2 in which the present invention is particularly useful. The disc drive 2 includes a base member 4 to which an other components are directly or indirectly mounted and a top cover 6 (shown in partial cutaway) which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

Figure 2A:
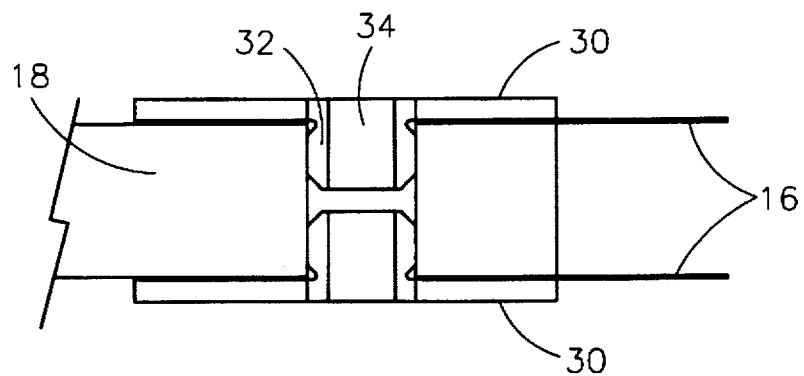
FIGS. 2A through 2C are simplified diagrammatic sectional elevation views of prior art swage mounting systems for head/flexure assemblies.
Figure 2B:
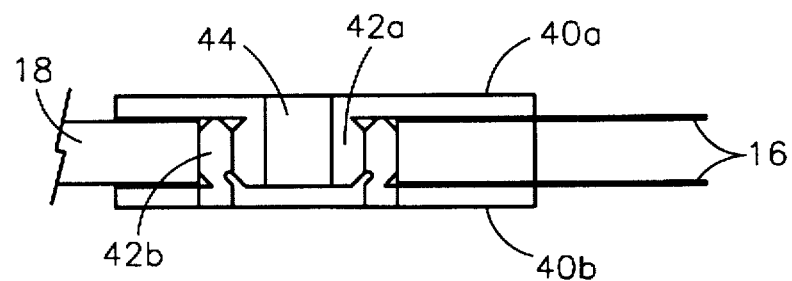
Figure 2C:
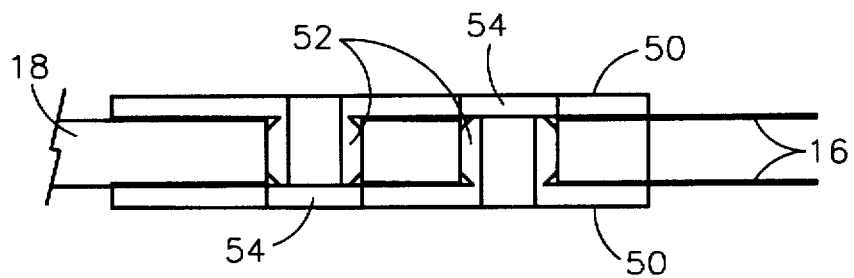

Turning now to FIGS. 2A through 2C, shown are simplified diagrammatic sectional elevation views of prior art swage mounting systems for attaching head/flexure assemblies (14/16 in FIG. 1) to actuator head mounting arms (18 in FIG. 1). In particular, FIG. 2A shows what is typically referred to in the industry as "back-to-back" swaging. In this swage mounting system, mounting plates 30, each including a swaging boss 32, are welded to flexures 16 which support heads (not shown) at their distal ends. The swaging bosses 32 are inserted in a single hole (not designated) in the actuator head mounting arm 18. Assembly is accomplished by passing a swaging tool (not shown) through the central opening 34 in the swaging bosses 32. This swaging tool has an outer diameter slightly larger than the inner diameter of the central opening 34 in the swaging boss 32, causing the outer surface of the swaging bosses 32 to be expanded into contact with the inner surface of the opening in the actuator head mounting arm 18. By closely controlling the dimensions of the opening in the actuator head mounting arm 18, the central opening 34 in the swage bosses 32 and the diameter of the swaging tool, the desired amount of attachment force can be selected. Furthermore, several identical vertically aligned sets of paired head/flexure assemblies can be attached with a single pass of the swaging tool. It is apparent from FIG. 2A, however, that the only way to remove a defective head/flexure assembly mounted in this manner is to insert a knife-like tool between the actuator head mounting arm 18 and the mounting plate 30 and pry off the defective assembly. This results in a high probability of causing damage to the actuator head mounting arm 18, with attendant high scrap costs.

FIG. 2B shows the Interlok™ swage mounting system of head/flexure mounting. This system comprises an upper mounting plate 40a and a lower mounting plate 40b, each welded to a head-supporting flexure 16. The upper mounting plate 40a includes an inner swage boss 42a, while the lower mounting plate 40b includes an outer swage boss 42b having an inner diameter substantially equal to the outer diameter of the inner swage boss 42a. During assembly, the lower mounting plate 40b is placed on the lower surface of the actuator head mounting arm 18 with the outer swage boss 42b inserted in a similarly dimensioned hole in the actuator head mounting arm 18. The upper mounting plate 40a is placed on the upper surface of the actuator head mounting arm 18 with the inner swage boss 42a extending into the outer swage boss 42b. The swaging tool (not shown) is then passed through the central opening 44 in the inner swage boss 42a, expanding the inner swage boss 42a into contact with the inner surface of the outer swage boss 42b, causing the outer swage boss 42b to expand, in turn, into contact with the inner surface of the opening in the actuator head mounting arm 18. This system of attaching head/flexure assemblies to actuator head mounting arms 18 has the advantage of allowing a thinner actuator head mounting arm 18, since the inner swage boss 42a and the outer swage boss 42b are horizontally aligned, thus occupying the same vertical space. There are, however, several drawbacks to this system which will be discussed below.

The head/flexure mounting system of FIG. 2C is the system described in previously incorporated U.S. Pat. No. 5,262,911. From the figure it can be seen that a pair of mounting plates 50 each includes a swage boss 52 located near one end and an opening 54 near the opposite end. One of the mounting plates 50 (the lower mounting plate in FIG. 2C) is welded to a flexure 16 with the swage boss 52 nearest the distal end of the actuator head mounting arm 18 and the opening 54 closer to the base of the actuator head mounting arm 18. The orientation of the mounting plate relative to the flexure is reversed for the other mounting plate. FIG. 2C shows that the upper mounting plate 50 is welded to the flexure 16 with its opening 54 closest to the distal end of the actuator head mounting arm 18 and its swage boss closer to the base of the actuator head mounting arm 18. This arrangement results in the swage boss 52 of one mounting plate 50 being aligned with the opening 54 in the other mounting plate 50 when the mounting plate/flexure/head assemblies are place on opposite sides of the actuator head mounting arm 18. This system of head/flexure mounting also provides minimal vertical height requirements in the disc drive, since, as in the system of FIG. 2B, the swage bosses 52 are horizontally aligned and occupy the same vertical space.

The disadvantages of the system of FIG. 2C include the fact that the mounting plates 50 must be substantially twice as long as the mounting plates 30, 40a, 40b of FIGS. 2A and 2B, adding undesirable mass and inertia to the actuator assembly. Furthermore, the swaging tool must preferably be passed through the swaging bosses in opposite directions for up and down head/flexure assemblies, complicating the assembly process. Additionally, the use of this in-line swage mounting system results in differing "up" and "down" head/flexure assemblies, with attendant complications in assembly tooling and inventory tracking.

Figure 3A:
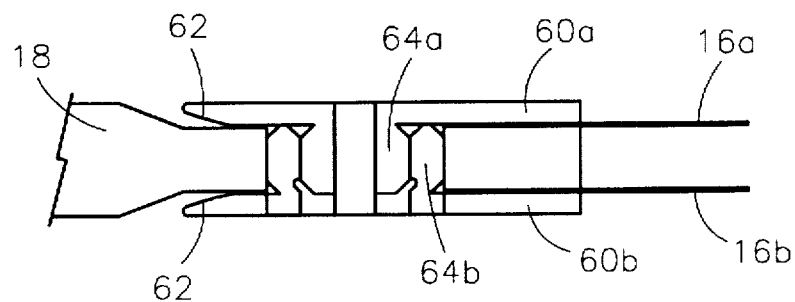
FIGS. 3A through 3E are simplified diagrammatic sectional elevation views illustrating prior art systems for removing swage mounted head/flexure assemblies.

FIGS. 3A through 3E are simplified diagrammatic sectional elevation views illustrating prior art systems of swage mounting of head/flexure assemblies and various modifications which facilitate removal of defective head/flexure assemblies. Specifically, FIG. 3A shows a swaging system similar to that previously discussed in relationship to FIG. 2B above. The difference is that the mounting plates 60a, 60b include beveled surfaces 62 which aid in the insertion of a blade-like disassembly tool (not shown) which can be used to pry the mounting plates 60a, 60b away from the actuator head mounting arm 18. Such a mounting plate incorporating a beveled surface for assisting in the removal of defective head/flexure assemblies is the subject of U.S. Pat. 5,012,367, issued Apr. 30, 1991 and U.S. 5,191,705, issued Mar. 9, 1993, both also assigned to the assignee of the present invention and incorporated herein by reference. While such a mounting plate is more easily removed from the actuator head mounting arm 18 than the flat mounting plates of FIGS. 2A through 2C, the danger of damaging the actuator bed mounting arm 18 during removal of a defective head/flexure assembly is still present. Furthermore, since the head/flexure mounting system is of the type referred to as the Interlok™ system, another drawback exists. If the defective component to be disassembled is a part of the upper head/flexure assembly, represented by upper flexure 16a, then the inner swage boss 64a of the upper mounting plate 60a can be pried out of the outer swage boss 64b of the lower mounting plate 60b. If however; the defective component is a portion of the lower head/flexure assembly, represented by lower flexure 16b, then the removal of the lower mounting plate 60b also results in the removal of the upper mounting plate 60a, since the upper mounting plate 60a is swaged mounted to the outer swage boss 64b of the lower mounting plate 60b. Since the removal of the mounting plate will likely lead to damage to the non-defective head/flexure assembly, such a system results in twice the scrap cost that would be incurred if only the defective head/flexure assembly could be removed.

Figure 3B:
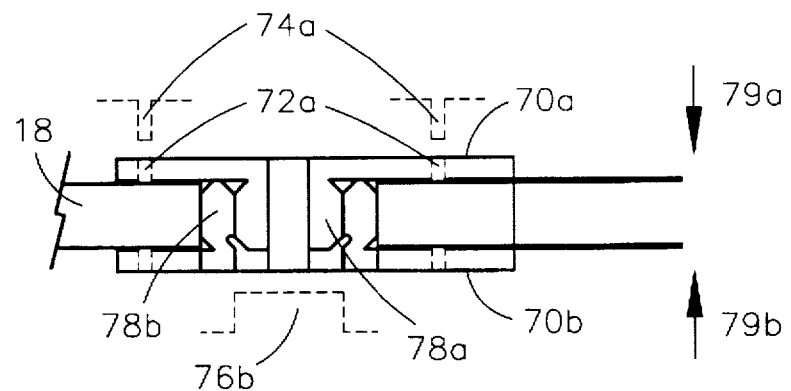
Figure 3C:
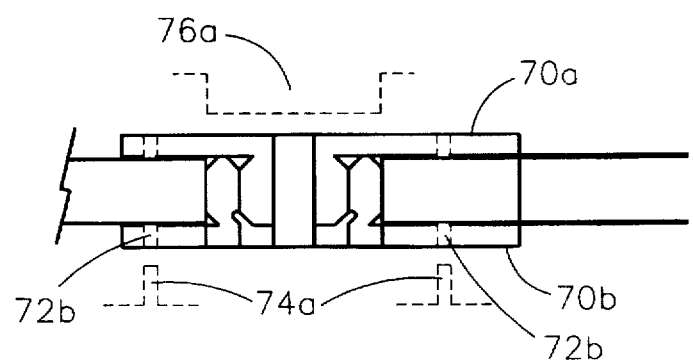

A second prior art system for removal of defective head/flexure assemblies is shown in FIGS. 3B and 3C. The swaging system of FIGS. 3B and 3C is also of the Interlok™ 9 type. In the figures, both the upper and lower mounting plates 70a, 70b include through holes 72a, 72b. Elements of a disassembly tool for removing the upper mounting plate 70a are shown in FIG. 3B, while elements of a disassembly tool for removal of the lower mounting plate 70b are shown in FIG. 3C.

In FIG. 3B, a pair of arm contact pins 74a, dimensioned to fit in the holes 72a in the upper mounting plate 70a, are shown, along with an inner boss contact pin 76b dimensioned to fit within the inner diameter of the outer swage boss 78b and contact the inner swage boss 78a. During component removal, the arm contact pins 74a, carried on a first tool portion (not designated) are inserted through the holes 72a in the upper mounting plate 70a and into contact with the upper surface of the actuator head mounting arm 18, while the inner boss contact pin 76b, mounted to a second tool portion (also not designated) is inserted through the outer swage boss 78b and into contact with the lower surface of the inner swage boss 78a. When the first and second tool portions are pressed together, in the directions shown by arrows 79a and 79b, respectively, the inner swage boss 78a is pressed out of the outer swage boss 78b and the upper mounting plate 70a is removed from the actuator head mounting arm 18.

Similarly, as shown in FIG. 3C, arm contact pins 74a are inserted through holes 72b in the lower mounting plate 70b, while an outer swage boss contact pin 76a contacts and presses the lower mounting plate 70b away from the actuator head mounting arm 18. It is apparent from an examination of FIG. 3C, however, that the lower mounting plate 70b cannot be removed without first removing the upper mounting plate 70a, since the outer swage boss contact pin 76a cannot contact the outer swage boss 78b if the upper mounting plate 70a is in place. This leads to the double scrapping costs noted above for FIG. 3A, which, in fact, applies to all configurations of swage mounting that employ the Interlok™ system. A second drawback to the disassembly system of FIGS. 3B and 3C is that a different tool must be used for removal of up and down head/flexure assemblies, due to the differences in diameter of the inner and outer swage bosses 78a, 78b.

Figure 3D:
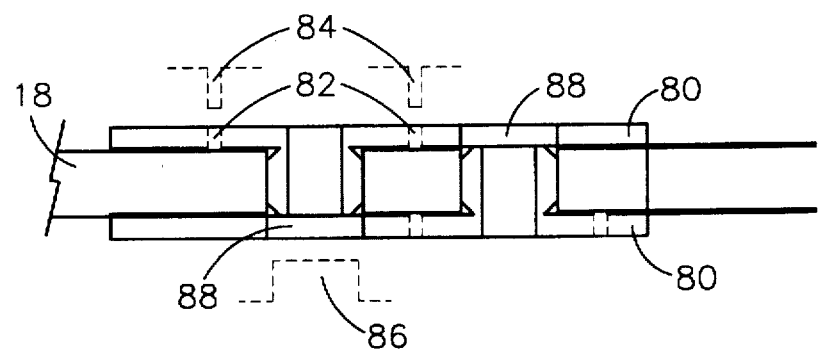
Figure 3E:
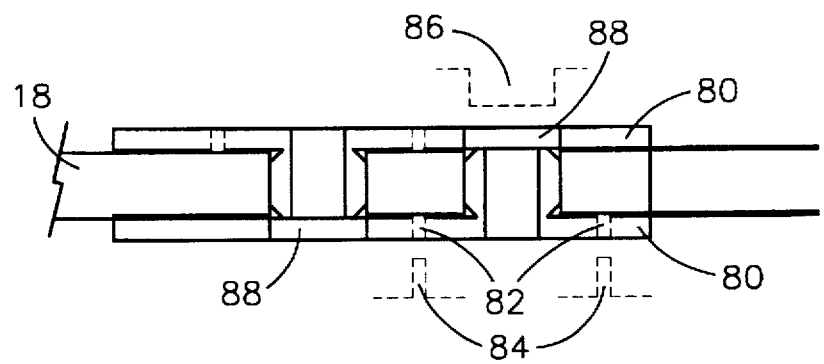

FIGS. 3D and 3E show a disassembly system for removal of head/flexure assemblies which include the "in-line" swaging discussed above in relationship to FIG. 2C. In FIGS. 3D and 3E, it can be seen that both the upper and lower mounting plates 80 include through holes 82, similar to those discussed above in relationship to FIGS. 3B and 3C. FIGS. 3D and 3E also show arm contact pins 84 and swage boss contact pins 86, carried on first and second disassembly tools (not designated), respectively. It should be noted that the swage boss contact pins 86 can be the same size for removal of both up ad down assemblies because of the presence of the boss access holes 88. In fact, the same disassembly tool can be used for removal of both up and down head/flexure assemblies by simply inverting the tool portions and aligning the arm contact pins 84 with the through holes 82 in the mounting plates 80 and the swage boss contact pin 86 with the appropriate swage boss. Furthermore, either the upper or lower head flexure assembly can be removed without removal of the other assembly attached to the same actuator head mounting arm 18, a distinct advantage over the systems of FIGS. 3A through 3C. It should be recalled, however, that the swage mounting system of FIGS. 3D and 3E still introduces a dissimilarity in swage boss location in up and down head/flexure assemblies and adds additional mass and inertia to the actuator assembly.

Swage mounting plates including through holes for disassembly and a disassembly tool as discussed hereinabove are disclosed in U.S. Pat. No. 5,471,735 and U.S. Pat. No. 5,347,413, both of which are also assigned to the assignee of the present invention and incorporated herein by reference.

Figure 4A:
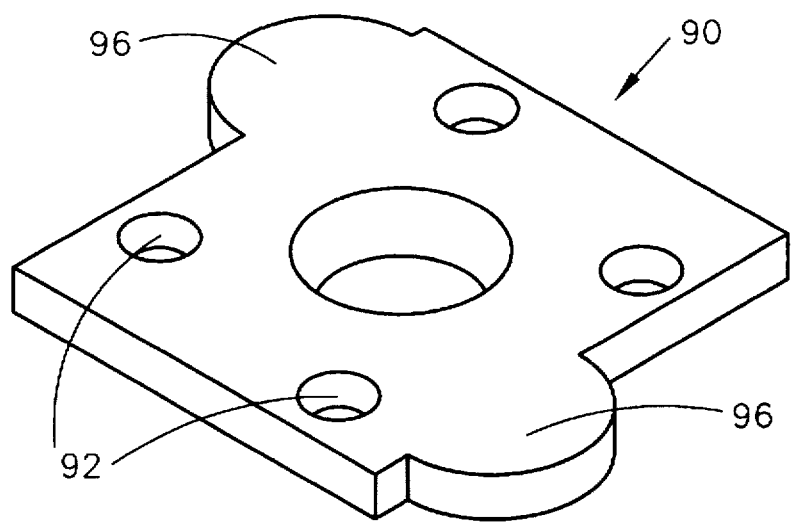
FIGS. 4A and 4B are top and bottom perspective views, respectively, of the improved swage mounting plate which forms a portion of the present invention.
Figure 4B:
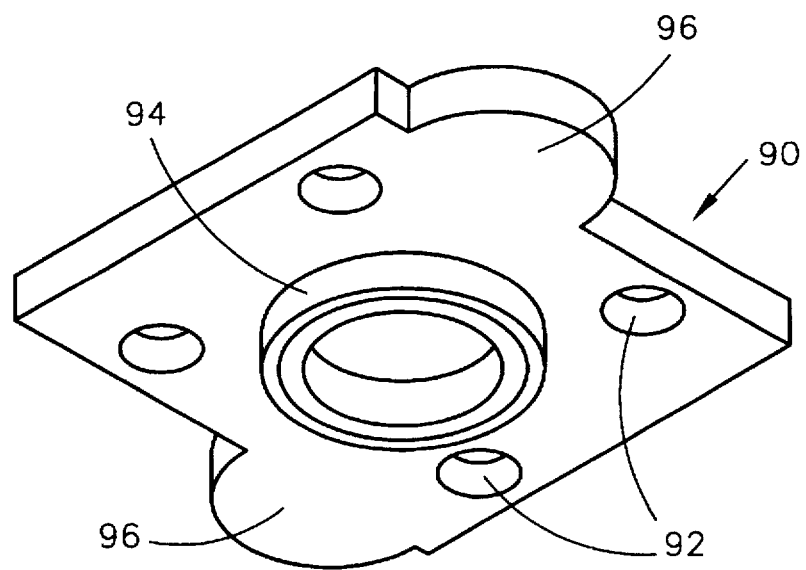

FIGS. 4A and 4B show top and bottom perspective views, respectively, of a mounting plate 90 that forms a part of the present invention. The mounting plate 90 includes through holes 92 similar to the through holes in the prior art mounting plates of FIGS. 3B through 3E. The holes 92 allow one portion of a disassembly tool (not shown) to be inserted through the holes 92 to contact the actuator head mounting arm (also not shown). The bottom perspective view of FIG. 4B also shows the swage boss 94 used to attach the mounting plate 90. All of these elements are common to previously discussed prior art mounting plates.

It should be noted from FIGS. 4A and 4B that the through holes 92 are positioned about the swage bosses 94 in a manner that is not symmetrical relative to the longitudinal and lateral axes of the mounting plate 90. It is well known in the industry that the locations of the welds used to attach the mounting plates 90 to head/flexure assemblies (not shown) should be symmetrically sited relative to the longitudinal and lateral axes of the mounting plate 90 and the flexure in order to evenly distribute the residual stresses applied to the assemblies by the welding process, and thus maintain the desired balanced forces transferred by the flexure assembly to the flying head. The locations of the through holes 92 are thus moved away from the locations reserved for the symmetrical welds.

FIGS. 4A and 4B also show the presence of deswaging tabs 96 which are a part of the present invention. The mounting plate 90 can be seen to be substantially square, and is intended to have a length and width which are substantially equal to the width of the actuator head mounting arms to which they will be attached. As seen in the figures the deswaging tabs are located adjacent diagonally opposed corners of the mounting plates 90. The mounting plates 90 are intended to be welded to head-supporting flexures in an orientation such that the deswaging tabs 96 will extend laterally beyond the lateral edges of the actuator head mounting arms once the mounting plates with attached flexures are mounted to the actuator head mounting arms. The manner in which the deswaging tabs 96 are envisioned to facilitate removal of defective head/flexure assemblies will be discussed below.

Figure 5A:
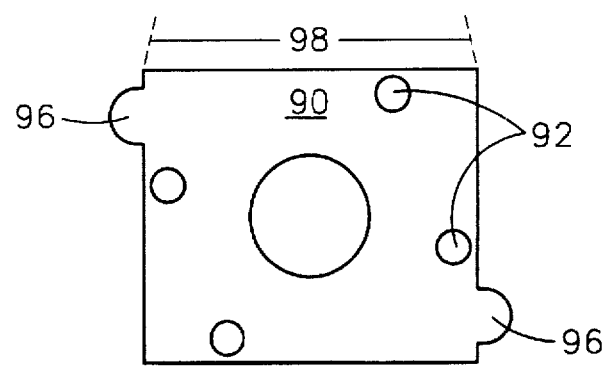
FIGS. 5A through 5C are plan views of the improved swage mounting plate of FIGS. 4A and 4B.
Figure 5B:
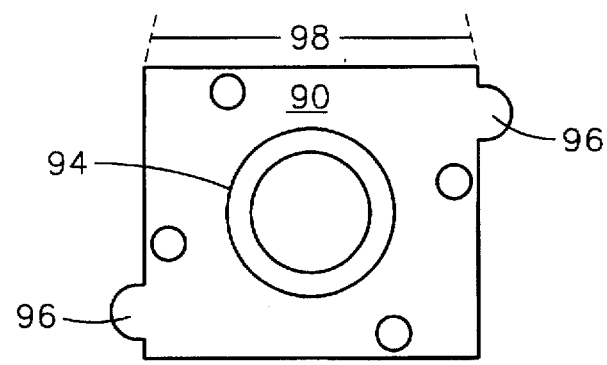
Figure 5C:
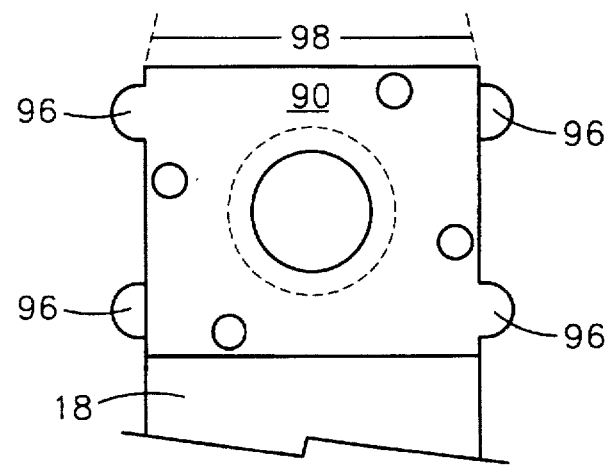

FIGS. 5A through 5C are plan views showing other aspects of the mounting plates 90. Specifically, FIG. 5A shows a top view of a mounting plate 90, while FIG. 5B shows a bottom view of a similar mounting plate 90. FIG. 5C, in turn, shows a pair of mounting plates 90 as they would be aligned when mounted to an actuator head mounting arm 18. The location of an attached head flexure assembly is represented in the figures by dashed lines 98. If FIGS. 5A and 5B are considered to be top plan views of head/flexure/mounting plate assemblies intended for attachment to the upper and lower surfaces, respectively, of a single actuator head mounting arm, the head/flexure assembly would be located on the back side of the mounting plate 90 of FIG. 5A, and on the near side of the mounting plate 90 of FIG. 5B. Thus, the orientation of the mounting plates 90 and deswaging tabs 96 in relationship to the head/flexure assemblies will be identical for both up and down assemblies, minimizing the tooling and fixtures needed for assembly.

It is most apparent from FIG. 5C, however, that, when the mounting plates 90 are brought into their intended vertically aligned relationship, the deswaging tabs 96 of upper and lower mounting plates 90 are not vertically aligned. That is, the upper mounting plate 90, shown in FIG. 5A and closest to the viewer in FIG. 5C, has its deswaging tabs 96 extending laterally from the upper left and lower right corners while the lower mounting plate 90, shown in FIG. 5B and mostly hidden from view behind the upper mounting plate 90 in FIG. 5C, has its deswaging tabs 96 extending laterally from the lower left and upper right corners. This means that the surfaces of the deswaging tabs 96 which are closest to the actuator head mounting arm 18 will be exposed for contact with a disassembly tool as will be discussed in detail below.

Figure 6:
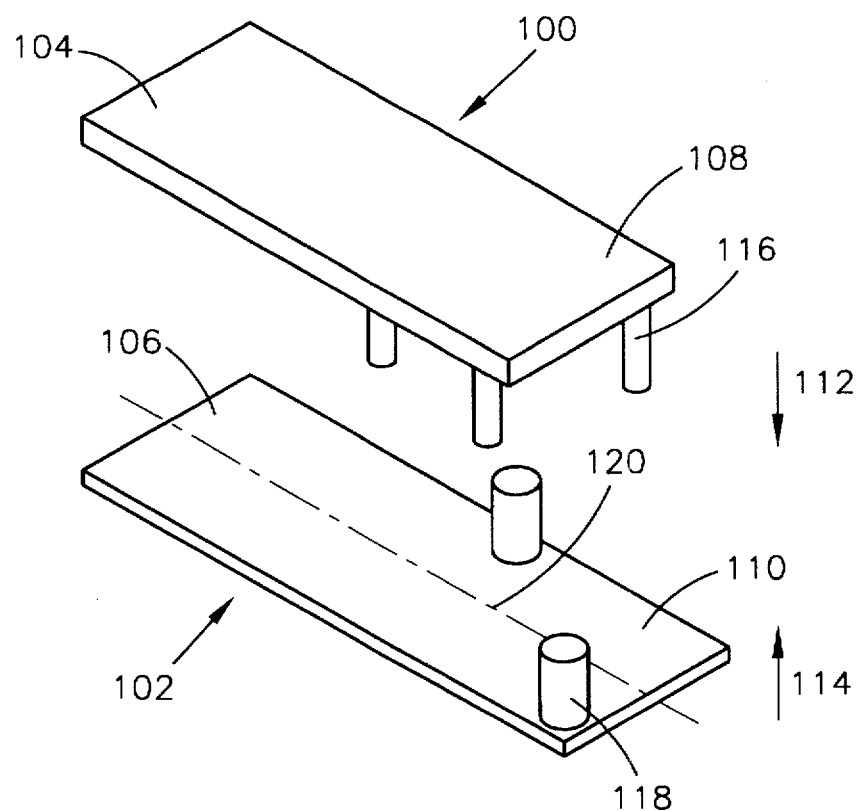
FIG. 6 is a perspective view of portions of a disassembly tool which is adapted for use in removal of head/flexure assemblies incorporating the swage mounting plate of FIGS. 4A through 5C.

FIG. 6 shows perspective views of two portions 100, 102 of a disassembly tool which can be used in conjunction with the mounting plate of the present invention for the removal of defective head/flexure assemblies from actuator head mounting arms. The disassembly tool portions 100, 102 each have a proximal end 104 and 106, respectively, and a distal end 108 and 110, respectively. It is envisioned that the proximal ends 104, 106 of the disassembly tool portions 100, 102, will be connected in a tweezer-like manner which will allow the disassembly tool portions 100, 102 to be brought together in the directions shown by arrows 112 and 114. It is also envisioned that the disassembly tool portions 100, 102 will be inserted laterally into a completed actuator assembly to accomplish removal of defective head/flexure assemblies, as will be discussed below.

Specifically, the first disassembly tool portion 100 includes a plurality of arm contact pins 116 positioned for cooperation with the through holes (92 in FIGS. 4A and 4B, and FIGS. 5A through 5C) in the mounting plates (90 in FIGS. 4A and 4B, and FIGS. 5A through 5C). The length of the arm contact pins 116 is selected to be greater than the thickness of the mounting plates, and furthermore to be of sufficient length to allow a mounting plate/head/flexure assembly to be displaced along the length of the arm contact pins 116 far enough to disengage a mounting plate swaging boss (94 in FIGS. 4A and 4B, and FIG. 5B) from the mounting hole in the actuator head mounting arm.

The second disassembly tool portion 102 includes a pair of deswaging tab contact pins 118 positioned for interaction with the deswaging tabs (96 in FIGS. 4A and 4B, and FIGS. 5A through 5C). That is, one of the deswaging tab contact pins 118 lies closely adjacent the distal end 110 of the second disassembly tool portion 102 and is displaced from the longitudinal centerline 120 in a first direction, while the other deswaging tab contact pin 118 is longitudinally displaced from the first by a distance substantially equal to the width of the mounting plate (90 in FIGS. 4A and 4B, and FIGS. 5A through 5C), and offset from the longitudinal centerline 120 in a second opposite direction from the first deswaging tab contact pin 118.

A simultaneous examination of FIGS. 5C and 6 will serve to illustrate the relative positioning of the disassembly tool to an assembled actuator. With the location of arm contact pins 116 and deswaging tab contact pins 118 shown in FIG. 6, the disassembly tool portions 100, 102 could be used in the orientation shown to remove a head/flexure assembly attached to the upper surface of the actuator head mounting arm if the disassembly tool were inserted into the actuator assembly from the left side of FIG. 5C. That is, if the first disassembly tool portion 100 were placed atop the mounting plate configuration of FIG. 5C, the arm contact pins 116 would pass through the through holes 92 of the upper mounting plate 90 of FIG. 5C and into contact with the upper surface of the actuator head mounting arm 18. Meanwhile, the deswaging tab contact pins 118 will be aligned with the lower surface of the deswaging tabs 96 of the upper mounting plate 90. When the first and second disassembly tool portions 100, 102 are squeezed together, the pressure exerted on the deswaging tabs 96 will cause the swaging boss (94 in FIG. 5B) to be pressed out of the hole in the actuator head mounting arm 18.

It will also be apparent from a simultaneous examination of FIGS. 5C and 6 that if the relative position of the first and second disassembly tool portions 100, 102 were inverted, i.e., the first disassembly tool portion 100 positioned below the second disassembly tool portion 102 and the tool portions inserted from the right side of FIG. 5C, the relative positions of the arm contact pins 116 and the deswaging tab contact pins 118 would be appropriate for removal of a mounting plate/head/flexure assembly from the lower surface of the actuator head mounting arm 18.

Figure 7:
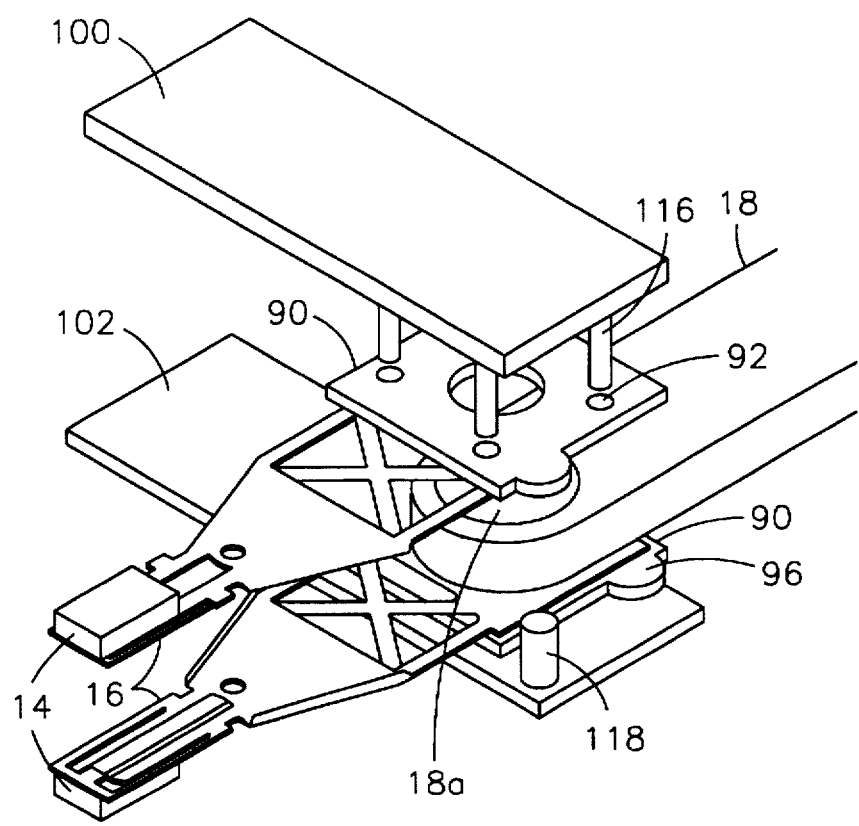
FIG. 7 is a perspective view showing the relationship of the disassembly tool of FIG. 6 to both up and down head/flexure assemblies incorporating the swage mounting plate of FIGS. 4A through 5C and an actuator head mounting arm.

FIG. 7 is a perspective exploded view of a pair of head/flexure/mounting plate assemblies 14/16/90 positioned above and below an actuator head mounting arm 18. In the figure, the first and second disassembly tool portions 100, 102 are seen to be inserted laterally from the left side of the figure. The arm contact pins 116 of the first disassembly tool portion 100 can be seen to be aligned with the through holes 92 in the upper mounting plate 90, while the deswaging tab contact pins 118 of the second disassembly tool portion 102 can be seen to align with the lower surfaces of the deswage tabs 96 of the upper mounting plate 90. Thus when the first and second deswaging tool portions 100 and 102 are squeezed toward each other, pressure will be exerted on the upper surface of the actuator head mounting arm 18 by the arm contact pins 116 and on the lower surface of the deswage tabs 96 of the upper mounting plate 90 by the deswaging tab contact pins 118. If sufficient pressure is thus applied, the swage boss (not designated) of the upper mounting plate 90 will be forced out of the hole 18a in the actuator head mounting arm 18, removing the upper head/flexure/mounting plate assembly 14/16/90.

Furthermore, if the first and second disassembly tool portions 100 and 102 were inverted, a similar relationship will result in the capability of removing the lower head/flexure/mounting plate assembly 14/16/90. Thus, the present invention permits the use of a single disassembly tool for the removal of both up and down head/flexure assemblies, as opposed to the need for two different disassembly tools as was noted for the Interlok™ swaging configuration in relationship to FIGS. 3B and 3C. The present invention could also be easily adapted for use with the in-line swaging system of FIG. 2C, and would also eliminate the need for the second hole (54 in FIG. 2C, 88 in FIGS. 3D and 3E) in each mounting plate, since the present invention envisions a deswaging tool which exerts removal force on laterally extending deswaging tabs rather than on the swage bosses themselves.

In a final aspect of the invention, a flex circuit is used to provide electrical conductance paths from the head to the disc drive read/write electronics, and this flex circuit is formed in the area adjacent the mounting plates to facilitate the removal of one defective head/flexure/mounting plate assembly from a head mounting arm without damaging another head mounted to the same head mounting arm.

Flex circuits for connecting the transducer terminals of disc drive heads are known in the art, and have become more widely used with the advent of MR heads, which require two pairs of leads (one pair for the inductive write element and the second pair for the MR read element) per head. Such flex circuit head leads are also gaining acceptance in the industry because they allow the elimination of discrete wires in supporting tubes, and the forming of channels or tube-supporting tabs in the flexure material. It has, however, been common practice in the industry to route the flex circuit along the lateral edges of the flexure mounting plates. Such routing would interfere with the engagement of the disassembly tool and the deswaging tabs of the improved mounting plate described above and lead to potential damage to a functional head/flexure assembly during the removal of a defective head/flexure assembly.

Figure 8:
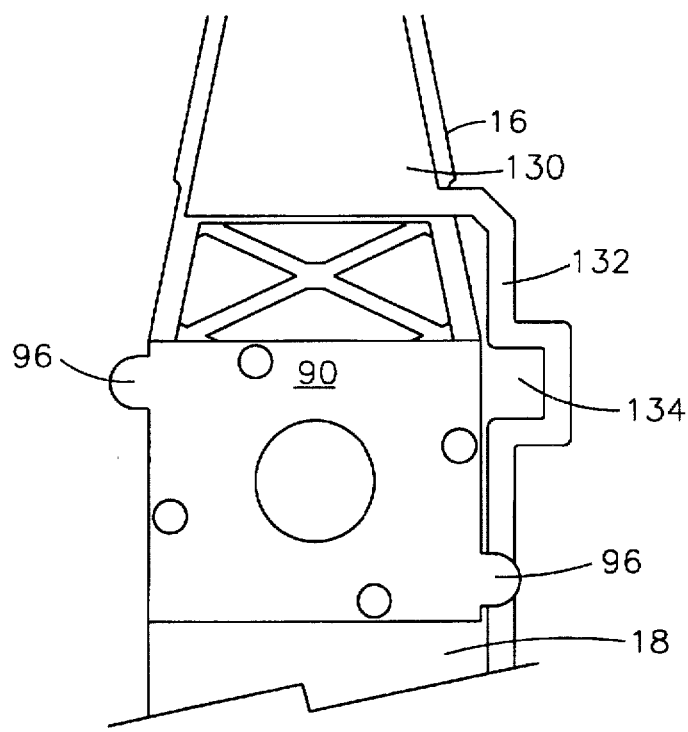
FIG. 8 is a plan view of a first head/flexure/mounting plate assembly made in accordance with the present invention and showing the configuration of a flex circuit useful therewith.
Figure 9:
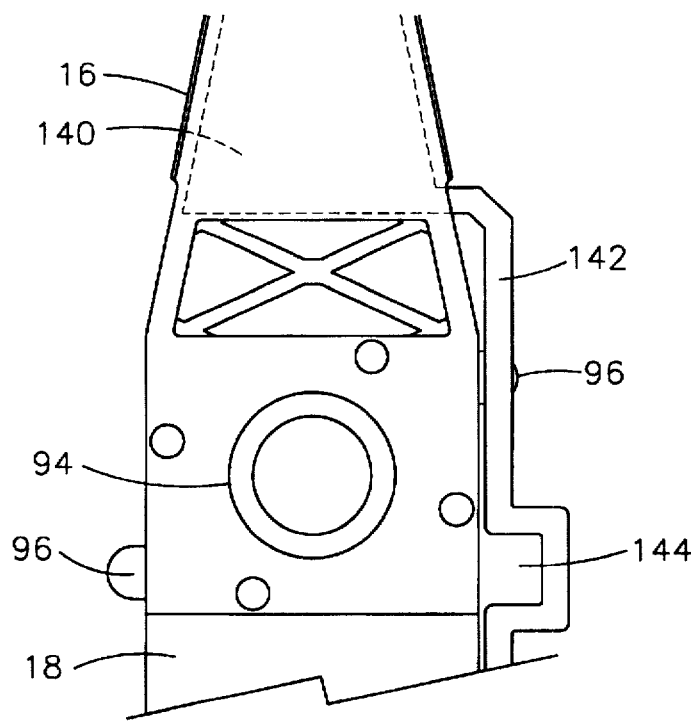
FIG. 9 is a plan view of a second head/flexure/mounting plate assembly made in accordance with the present invention and showing the configuration of a flex circuit useful therewith.

FIGS. 8 and 9 show improved flex circuit configurations which are particularly adapted for use with the improved mounting plate of the present invention. Specifically, FIG. 8 shows a flex circuit 130 for use with an improved mounting plate which is intended for attachment to the upper surface of an actuator head mounting arm, while FIG. 9 shows a flex circuit 140 for use with an improved mounting plate which is intended for attachment to the lower surface of anactuator head mounting arm.

Turning now to FIG. 8, it can be seen that the flex circuit 130 includes a trace portion 132 which passes along the lateral edge of the mounting plate 90. In the figure, the flexure 16 is attached to the far side of the mounting plate 90, with the mounting boss (94 in FIGS. 4B and 5B) extending through a cooperatively sized hole in the mounting portion of the flexure. The flex circuit 130 and associated head (14 in FIG. 1) are attached to the near side of the flexure 16.

FIG. 8 shows that, as the trace portion 132 of the flex circuit 130 runs past the mounting plate 90, the trace portion 132 is shaped to extend away from the lateral edge of the mounting plate near the upper right corner of the mounting plate 90, and then bends back into proximity to the lateral edge of the mounting plate as it passes below the deswaging tab 96 at the lower right corner of the mounting plate 90. This shaping of the flex circuit 90 provides an opening, or window, 134 between the mounting plate 90 and the trace portion 132 of the flex circuit near the mounting plate's upper right corner. If the disassembly tool of FIGS. 6 and 7 is envisioned as being inserted from the right side of the drawing with the second disassembly tool portion (102 in FIGS. 6 and 7) closest to the viewer, the deswaging tab contact pins (118 in FIGS. 6 and 7) are oriented to pass near the upper right and lower left corners of the mounting plate 90. In such an orientation, one of the deswaging tab contact pins would pass through the opening 134 formed by the trace portion 132 of the flex circuit. This tool orientation relative to the mounting plate would be appropriate for removal of a head/flexure/mounting plate assembly mounted on the opposite side of the head mounting arm from the mounting plate 90 of FIG. 8. By providing a window 134 for the passage of the deswaging tab contact pin, the flex circuit of the present invention permits the removal of a defective head/flexure assembly from the opposite side of the actuator head mounting arm 18 of FIG. 8 without causing any potentially damaging contact with the head/flexure assembly of the figure.

Similarly, FIG. 9 shows a flex circuit 140 suitable for use on a head/flexure assembly intended for mounting opposite the assembly of FIG. 8. The assembly of FIG. 9 is oppositely oriented relative to the assembly of FIG. 8. That is, the flexure 16 is shown on the near side of the mounting plate 90, with the swage boss 94 extending through the flexure toward the viewer, and the flex circuit 140 is attached to the far side of the flexure as viewed.

In FIG. 9, the flex circuit 140 can be seen to include a trace portion 142 which lies closely alongside the mounting plate 90 in the upper right corner, where it passes over the deswaging tab 96, and bends away from the lateral edge of the mounting plate 90 near it lower right corner. In order to remove a defective head/flexure assembly mounted opposite the assembly of FIG. 9 (such as the assembly of FIG. 8), the disassembly tool of FIGS. 6 and 7 would be inserted again from the right of the figure, but with the first disassembly tool portion (100 in FIGS. 6 and 7) closest the viewer. This is the same orientation of disassembly tool insertion shown in FIG. 7. In this orientation, one of the deswaging tab contact pins on the second disassembly tool portion (118 and 102, respectively, in FIGS. 6 and 7) would pass through the window 144 formed by the trace portion 142 of the flex circuit, enabling contact with the deswaging tab of the opposing head/flexure assembly without damaging the still operable head/flexure assembly of FIG. 9.

If the head/flexure/mounting plate assemblies of FIGS. 8 and 9 were placed atop one another as they would be if mounted to the same actuator head mounting arm, i.e., with the assembly of FIG. 8 on top of the assembly of FIG. 9, it will be noticed that the deswaging tab contact pins of the disassembly tool described above can engage the deswaging tabs of a defective assembly without adversely contacting a good assembly on the same actuator head mounting arm. For instance, if it is assumed that the assembly of FIG. 9 is defective, removal of the defective assembly would be affected by inserting the disassembly tool of FIGS. 6 and 7 from the right side of the drawing with the second disassembly tool portion (102 in FIGS. 6 and 7) closest to the viewer. In this orientation, the deswaging tab contact pins of the deswaging tool would lie near the upper right and lower left corners of the mounting plates, and one of the deswaging tab contact pins would thus pass through the window 134 formed by the trace portion 132 of the flex circuit 130 and come to bear on the trace portion 142 of the flex circuit 140 of the assembly of FIG. 9 where it passes over the upper right deswaging tab 96 of the assembly.

At the same time, the actuator arm contact pins (116 in FIGS. 6 and 7) on the first disassembly tool portion (1 00 in FIGS. 6 and 7) would pass through the holes (92 in FIGS. 4A, 4B, 5A and 7) in the far mounting plate and come into contact with the far side of the actuator head mounting arm 18. Thus, even though the deswaging tab contact pins actually contact the trace portion of the flex circuit, the possibility of damage to the flex circuit is not a concern, since the assembly is being removed because of a defect anyway.

An examination of FIGS. 8 and 9 will also reveal that the same conditions exist for removal of an upper head/flexure/mounting plate assembly if the orientation of the disassembly tool portions were reversed, i.e., the first disassembly tool portion 100 were closest to the viewer.

The present invention can thus be seen to be particularly well adapted and particularly well suited to provide a head/flexure mounting system which facilitates simple removal of head/flexure assemblies that are found to be defective after assembly to a disc drive actuator assembly. The invention further permits a single disassembly tool to be employed for the removal of both up and down head/flexure assemblies by simply changing the orientation of the disassembly tool relative to the actuator assembly. The invention is also desirable inasmuch as it adds minimal or no additional component or assembly costs while achieving the mentioned advantages. The invention also adds minimal additional moving mass to the actuator assembly which could have a negative effect on actuator performance.

From the foregoing, it is apparent that the present invention is particularly well suited to achieve the objects and provide the benefits set forth hereinabove as well as others inherent therein While a particular embodiment of the invention has been described herein, modifications to the embodiment which fall within the envisioned scope of the invention may become apparent to one of skill in the art after reading this disclosure. Therefore, the scope of the invention should be considered to be limited only by the following claims.

What is claimed is:

1. An improved swage mounting plate for attaching a head/flexure assembly to an actuator head mounting arm in a disc drive, the swage mounting plate including deswaging tabs located adjacent diagonally opposed corners of the swage mounting plate and extending laterally beyond the width of the head mounting arm when assembled to the head/flexure assembly and mounted to the head mounting arm.

2. In a swage mounting system for attaching head/flexure assemblies to head mounting arms in a disc drive wherein each of said head/flexure assemblies is fixedly attached to a mounting plate including a swage boss for cooperative engagement with a hole in each of said head mounting arms and wherein pairs of said mounting plates are mounted to opposing upper and lower surfaces of said head mounting arms, the improvement comprising:

deswaging tabs located adjacent diagonally opposed corners of the swage mounting plate and extending laterally beyond the width of the head mounting arm when assembled to the head/flexure assembly and mounted to the head mounting arm.

3. A system for mounting a head/flexure assembly to a head mounting arm in a disc drive and facilitating the removal of the head/flexure assembly if it is found to be inoperable comprising:

a swage mounting plate fixedly attached to the head/flexure assembly and including
a swage boss for engaging a hole in the head mounting arm and attaching the mounting plate, with attached head/flexure assembly, to the head mounting arm,
a plurality of through holes open through the mounting plate to the surface of the head mounting arm on which the head/flexure assembly is mounted, and
deswaging tabs located adjacent diagonally opposed corners of the swage mounting plate and extending laterally beyond the width of the head mounting arm when the mounting plate is assembled to the head/flexure assembly and mounted to the head mounting arm, and a deswaging tool comprising
first and second portions each having a proximal end and a distal end, the proximal ends connected in a tweezer-like manner,
the distal end of the first deswaging tool portion including a plurality of arm contact pins, positioned and dimensioned for cooperation with the through holes in the mounting plate, for contacting the head mounting arm through the through holes,
the distal end of the second deswaging tool portion including a plurality of deswaging tab contact pins, positioned and dimensioned for cooperation with the deswaging tabs on the mounting plate, for contacting the deswaging tabs wherein, when the deswaging tool is positioned relative to a head/flexure assembly which is to be removed and the first and second deswaging tool portions are encouraged toward one another, the pressure of the deswaging tab contact pins against the deswaging tabs will cause the mounting plate to be displaced along the length of the arm contact pins until the swaging boss is removed from its engagement with the head mounting arm.

4. A system for mounting a head/flexure assembly, the head/flexure comprising a flexure and a head mounted on the flexure, to a head mounting arm in a disc drive and facilitating the removal of the head/flexure assembly if it is found to be inoperable comprising:

a swage mounting plate fixedly attached to the head/flexure assembly and including
a swage boss for engaging a hole in the head mounting arm and attaching the mounting plate, with attached head/flexure assembly, to the head mounting arm,
a plurality of through holes open through the mounting plate to the surface of the head mounting arm on which the head/flexure assembly is mounted, and
deswaging tabs located adjacent diagonally opposed corners of the swage mounting plate and extending laterally beyond the width of the head mounting arm when the mounting plate is assembled to the head/flexure assembly and mounted to the head mounting arm, a flex circuit attached to the flexure for providing electrical conductance paths between the head and disc drive read/write circuitry, the flex circuit comprising a trace portion lying adjacent one lateral edge of the mounting plate and shaped to form a window around the deswaging tab located on that lateral edge of the mounting plate, and a deswaging tool comprising
first and second portions each having a proximal end and a distal end, the proximal ends connected in a tweezer-like manner,
the distal end of the first deswaging tool portion including a plurality of arm contact pins, positioned and dimensioned for cooperation with the through holes in the mounting plate, for contacting the head mounting arm through the through holes, the distal end of the second deswaging tool portion including a plurality of deswaging tab contact pins, positioned and dimensioned for cooperation with the deswaging tabs on the mounting plate, for contacting the deswaging tabs wherein, when the deswaging tool is positioned relative to a head/flexure assembly which is to be removed and the first and second deswaging tool portions are encouraged toward one another, one of the deswaging tab contact pins on the second deswaging tool portion will pass through the window formed in the trace portion of the flex circuit and the pressure of the deswaging tab contact pins against the deswaging tabs will cause the mounting plate to be displaced along the length of the arm contact pins until the swaging boss is removed from its engagement with the head mounting arm.

* * * * *